United States Patent

[11] 3,617,948

[72] Inventor Robert W. Lucky
Fair Haven, N.J.
[21] Appl. No. 858,781
[22] Filed Sept. 17, 1969
[45] Patented Nov. 2, 1971
[73] Assignee Bell Telephone Laboratories, Incorporated
Murray Hill, N.J.

[54] TRANSVERSAL EQUALIZER MODIFIED FOR SIGNAL FILTERING
6 Claims, 4 Drawing Figs.

[52] U.S. Cl. .......... 333/18, 333/70 T
[51] Int. Cl. .......... H04b 3/04
[50] Field of Search .......... 333/18, 28, 70 T

[56] References Cited
UNITED STATES PATENTS
3,297,951 1/1967 Blasbalg .......... 333/28 X
3,400,332 9/1968 O'Neill, Jr. et al. .......... 333/28 X
3,445,771 5/1969 Clapham et al. .......... 333/18 X

*Primary Examiner*—Herman Karl Saalbach
*Assistant Examiner*—Paul L. Gensler
*Attorneys*—R. J. Guenther and Kenneth B. Hamlin

ABSTRACT: The transversal equalizer with tap-spacing set for adaptive minimization of intersymbol interference in a synchronous digital data transmission system is modified to provide simultaneous shaping of the signal frequency spectrum. Adaptively variable tap gains for time domain equalization are augmented by fixed tap gains for frequency domain signal shaping. Signals from fixed and variable gain attenuators, relatively delayed by a fractional symbol interval with respect to each other, are combined to form optimized output signals. The respective fixed and variable gain contributions thus act substantially independently in accomplishing spectral shaping and intersymbol interference minimization due to their staggered relationships.

INVENTOR
R. W. LUCKY
BY J. P. Kearns
ATTORNEY

TRANSVERSAL EQUALIZER MODIFIED FOR SIGNAL FILTERING

FIELD OF THE INVENTION

This invention relates to equalization and frequency spectrum shaping of data communication channels in general and specifically to the simultaneous control of these two factors in a single apparatus.

BACKGROUND OF THE INVENTION

The problems of signal filtering to obtain a desired frequency response in data communication systems have become more acute as higher transmission speeds and more efficient bandwidth utilization are sought. Filters with sharper band-edge rolloffs than previously required are in demand. To attain these new requirements with conventional inductance-capacitance lumped filters, designs of increasing complexity and physical size are being created. The miniaturization of many other functions in data communications systems results in higher percentages of volume being occupied by filters.

In my U.S. Pat. No. 3,368,168, issued Feb. 6, 1968, there is disclosed an adaptive transversal equalizer which operates, responsive to error differences between standardized received data estimates and actual received signal samples, to increment gain factors at taps spaced along the equalizer at data-signaling intervals in a direction to minimize intersymbol interference. Any data communication system in which this adaptive equalizer has been used heretofore has also required sending and receiving filters to confine the transmitted signals to the assigned transmission channel bandwidth, to match the channel frequency characteristics, and to exclude out-of-band noise. The equalizer performs the function of intersymbol interference control. The sending and receiving filters perform a related function of frequency spectrum shaping.

It is an object of this invention to perform the filter spectral shaping function of conventional filters and the equalizing function of transversal equalizers substantially in the same apparatus.

It is another object of this invention to modify the adaptive transversal equalizer to perform the function of signal spectrum shaping as well as that of impulse-response equalization.

It is a further object of this invention to reduce the cost and size of apparatus for performing signal-shaping functions in a digital data system in which transversal equalizers are used.

SUMMARY OF THE INVENTION

According to this invention, an adaptive transversal equalizer having a plurality of taps spaced at synchronous signaling intervals therealong, variable tap gain attenuators controlled by correlations of the error difference between normalized and actual received signal amplitudes and the polarity of received signals for intersymbol interference minimization, and a linear adder for the several gain-controlled tap outputs is modified by providing at each of its taps additional fixed gains or their equivalents related to a desired signal spectrum shaping and means for adding to the summation of variable tap-gain components and in time-staggered relationship therewith a summation of fixed gain components. The time-staggered relationship between fixed and variable gain components is preferably a half-signaling interval. In accordance with illustrative embodiments of this invention this half-signaling interval delay between fixed and variable gain signal components can be advantageously realized (1) by separately adding the fixed and variable gain components and delaying one summation with respect to the other by a fixed delay of half a signaling interval and further combining these summations in a third summation, or (2) by providing half-signaling interval tap spacings on the transversal equalizer, connecting variable gain controls at even-ordered taps with respect to a designated reference tap, connecting fixed gains at odd-ordered taps and performing a single summation of all tap gain components.

In either embodiment the variable gain components minimize intersymbol interference and fixed gain components accomplish desired spectral shaping substantially independent of each other.

It is a feature of this invention that the normally complex analog shaping filters required in a data communication system are replaced in function by more tractable and less bulky digital components.

DESCRIPTION OF THE DRAWING

Further objects, features and advantages of this invention will become apparent from a study of the detail description when read in conjunction with the drawing in which.

DETAILED DESCRIPTION

Figure 1:
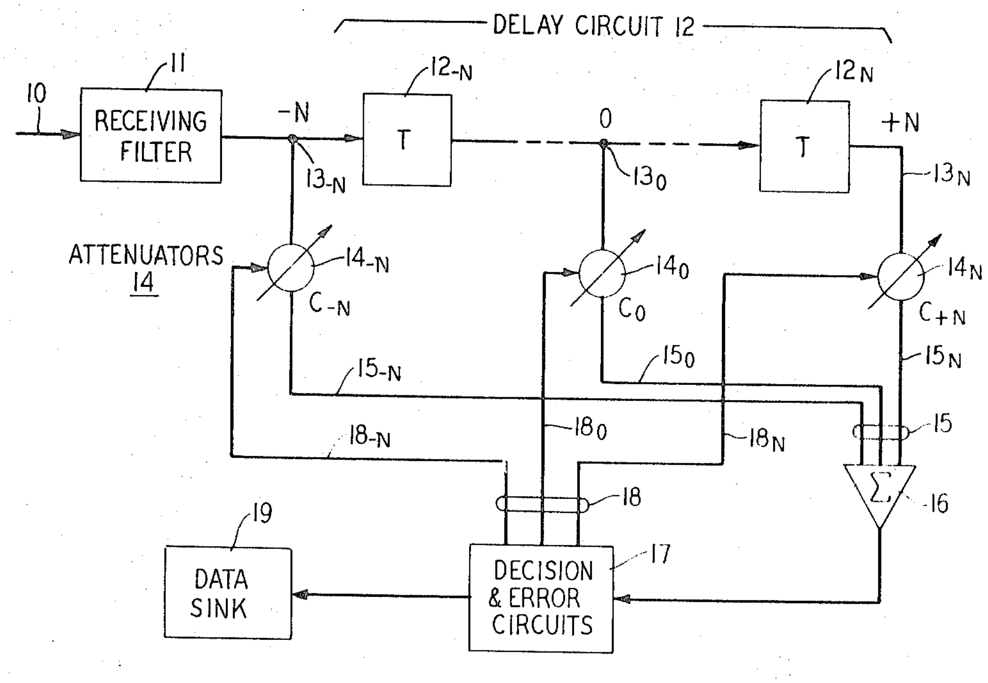
FIG. 1 PRIOR ART
FIG. 1 is a simplified block diagram of a known adaptive transversal equalizer used in a synchronous digital data communication receiver.

FIG. 1 illustrates in block diagram form the adaptive transversal equalizer of the type disclosed in my cited U.S. Pat. No. 3,368,168. The equalizer per se comprises a tapped delay circuit 12 having 2N unit delay elements, such as $12_{1N}$ and $12_{+N}$, separating 2N+1 tapping points such as $13_{1N}$, $13_0$ and $13_{+N}$; a variable attenuator for each tap 14, such as variable gain controls $14_{1N}$, $14_0$ and $14_{+N}$ each having a respective tap gain $C_{1N}$, $C_0$ and $C_{+N}$; a linear summation circuit or adder 16 at which the gain-controlled tap outputs are combined; and a decision and error circuit 17 in which error information derived from the differences between synchronously sampled received signals and normalized estimates of the data symbol encoded thereby are correlated with the data estimates and fed back to increment the variable attenuators in directions tending to minimize the error information. At the input of the transversal equalizer is a receiving filter 11, itself operating on a received data wave on line 10, and at the output ã data sink 19.

Receiving filter 11 operates in conjunction with a transmitting filter (not shown) to control the shaping of the frequency spectrum of the transmission path. The transmitting filter limits the signal spectrum applied to the transmission channel and matches it to the channel characteristics. It also removes higher frequency components from the transmitted signals and prevents them from interfering with other signals using the same channel on a frequency multiplex basis or from crosstalking into adjacent channels. The receiving filter serves to exclude noise and other interference added by the transmission channel. Certain spectral shapes are recognized as enhancing the probabilities of making a correct binary decision at sampling instants of received data signals. Particularly a raised cosine received pulse spectrum yields a pulse response characterized in that signal elements in a binary pulse train pass through either full or zero amplitude at the centers of pulse intervals and transitions between elements pass through half-amplitude levels at points midway between pulse centers. A further advantage of the raised cosine spectrum is that the tails of the pulse response die away rapidly. It is thus an additional function of transmitting and receiving filters to achieve in conjunction with the natural channel characteristic an overall characteristic approximating such a desired spectral shaping. Pulses transmitted through a properly shaped channel exhibit maximum tolerance to interference when sampled at the centers of the signaling intervals.

Transversal filters were first used for spectral shaping. Reference is made in this connection to U.S. Pat. No. 2,263,376, issued Nov. 18, 1941 to A. D. Blumlein et al. For a transversal filter having a delay line with an odd number of equally spaced taps at intervals of T seconds and tap weights $c_n$, $n$ extending from −N to +N, the transfer function represented by the summation of the weighted tap outputs is $$E(\omega)=\sum_{n=-N}^{N} c_n e^{-jn\omega T}$$

$$=\sum_{n=-N}^{N} c_n[\cos n\omega T - j \sin n\omega T] \qquad (1)$$

where $\omega$ = =radian frequency and $e$ = base of natural logarithms.

Equation (1) is periodic, being the summation of harmonically related cosine and sine terms, and the period is that of the fundamental frequency of $2\pi/T$ radians per second. It is therefore apparent that any spectral shaping desired within the frequency range determined by the reciprocal of the tap spacing can be approximated as closely as desired by increasing the number of taps. However, the periodicity of equation (1) determines this spectral response for all frequencies.

Figure 2:
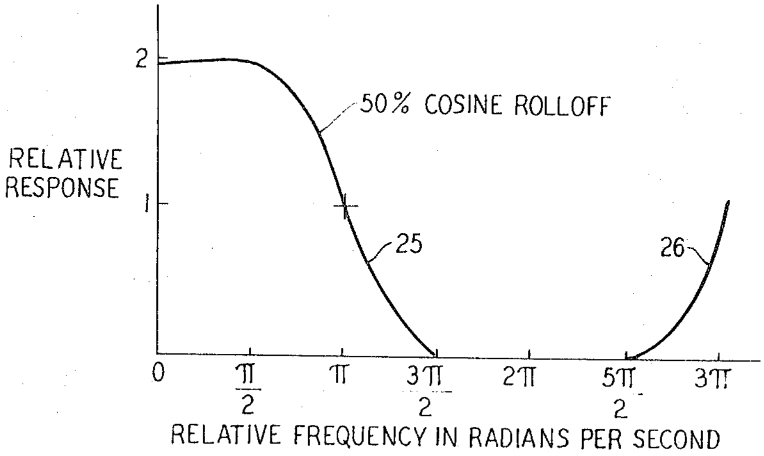
FIG. 2 is a representative frequency response characteristic for a transversal filter equalizer.

The cosine-derived frequency function, such as is shown in FIG. 2, is of particular interest in the practice of this invention. In accordance with the teachings of the Blumlein et al. patent, an even-ordered frequency response function can be synthesized in a transversal equalizer with equally spaced taps by assigning like coefficient values in the range of plus and minus one to pairs of taps symmetrically located with respect to a central tap. The principle of these teachings becomes clear when equation (1) is expanded as a Fourier harmonic series defining a symmetrical square wave. The equation shown by Blumlein et al. at line 39, column 1 of page 6, can be rewritten with the constant term normalized at unity as follows:

$$E(\omega)=1+\frac{4}{\pi}\cos \omega T-\frac{4}{3\pi}\cos 3\omega T$$

$$+\frac{4}{5\pi}\cos 5\omega T-\ .\ .\ .\ + \qquad (2)$$

The wave defined by equation (2) consists of a DC term plus a fundamental frequency and odd harmonics thereof. No sine terms or even harmonics of the fundamental frequency occur. The amplitudes of the harmonics are inversely proportional to their frequencies. Equation (2) is implemented in the transversal equalizer for frequency response control by selecting the center tap coefficient at a reference value of unity, i.e., $c_0$= 1; the sum of the odd-numbered symmetrical pair of tap coefficients nearest the reference tap equal to the coefficient of the cos $\omega$T term of equation (2), i.e., $c_1=c_{11}=+(½)(4/\pi)=+0.637$; the sum of the odd-numbered symmetrical pair of tap coefficients next farthest from the reference tap equal to the coefficient of the cos 3$\omega$T term of equation (2), i.e., $c_3=c_{13}=-(½(4/3\pi)=-0.212$; and so fourth. Equation (2) is seen to converge rapidly so that relatively few tap coefficients are required in practical systems. For example, evaluating the inner pair of coefficients $c_1$ and $c_{11}$ substantially yields a cosine frequency function with 100 percent rolloff, i.e., rolloff begins at zero frequency. Evaluating the next pair, $c_3$ and $c_{13}$, substantially provides the cosine function with 50 percent rolloff, i.e., rolloff begins at one-half the Nyquist frequency, shown in FIG. 2 and discussed hereinafter. Still steeper rolloffs are achieved by evaluating the coefficients of higher order cosine terms in equation (2).

It was also discovered that the transversal equalizer had utility in dealing with intersymbol interference. When T in equation (1) is the interpulse interval in a baseband data wave, the period T is twice the reciprocal of the Nyquist frequency of $\pi/T$ radians per second. The Nyquist frequency is the minimum frequency at which samples of a time-varying wave must be taken in order to characterize it completely. Through the sampling theorem, to which the concept of Nyquist frequency is related, there is a one-to-one correspondence between equalizer frequency response and impulse sample sequences. By specifying a suitable sequence of sample values, equivalent to choosing or setting tap gains, leading and lagging echoes of each impulse can be set off against one another while the reference tap weight $c_0$ is normalized at unity. Intersymbol interference at sampling instants T can thereby be minimized. Once the equalizer is set for interference minimization, however, the frequency response is also determined for all frequencies $\omega$. Heretofore there has been no way to specify both intersymbol interference reduction and a desired frequency or spectral response by use of a transversal equalizer alone. The transversal equalizer with tap spacing T equal to the signaling interval or twice the reciprocal of the Nyquist frequency lacks the necessary degrees of freedom simultaneously to control intersymbol interference and adjust spectral shaping.

I have discovered, however, that if the taps are spaced at T/2-second intervals, the transversal filter can be used to adjust the frequency spectrum using the teachings of Blumlein et al. over the bandwidth $2\pi/T$, which is twice the Nyquist range, and at the same time retain sufficient freedom to control intersymbol interference using the teachings of my prior patent. This becomes possible because only tap weights for taps numbered oddly in each direction from the center or reference tap need be set to control the frequency function. The center tap remains normalized at unity. The remaining even-numbered taps are then available for interference control.

The frequency or spectral response of a seven-tap transversal equalizer with T/2-second tap spacing with the four odd-ordered tap gains set to synthesize a 50 percent rolloff (rolloff begins at 50 percent of the equivalent Nyquist frequency $\pi/T$), raised cosine filter is shown in FIG. 2. The abscissa is the frequency in radians per second normalized for a Nyquist interval T of unity. The ordinate is relative response. The curve 25 is completely determined in the range of $2\pi$radians per second, which is twice the Nyquist frequency. The nominal cutoff frequency occurs at the frequency of $3\pi/2$ radians per second. However, in accordance with equation (1), the response is repetitive in the frequency domain with a period of $2\pi$ radians per second. Thus, curve 26 rising from $5\pi/2$ radians per second is the mirror image of curve 25. Signal components above the apparent cutoff of $3\pi/2$ radians per second are suppressed by the transversal filter only below $5\pi/2$ radians per second. Depending on the noise characteristics of the transmission system, a conventional low-pass filter may be required in tandem with the transversal filter. The low-pass filter requirement, however, are not severe, since the transversal filter already provides suppression over the relatively broad range of $3\pi/2$ to $5\pi/2$ radians per second. An essentially flat frequency response over the interval of zero to $3\pi/2$ radians per second and an arbitrary cutoff in the range of $3\pi/2$ to $5\ \pi/2$ radians per second suffices.

Figure 3:
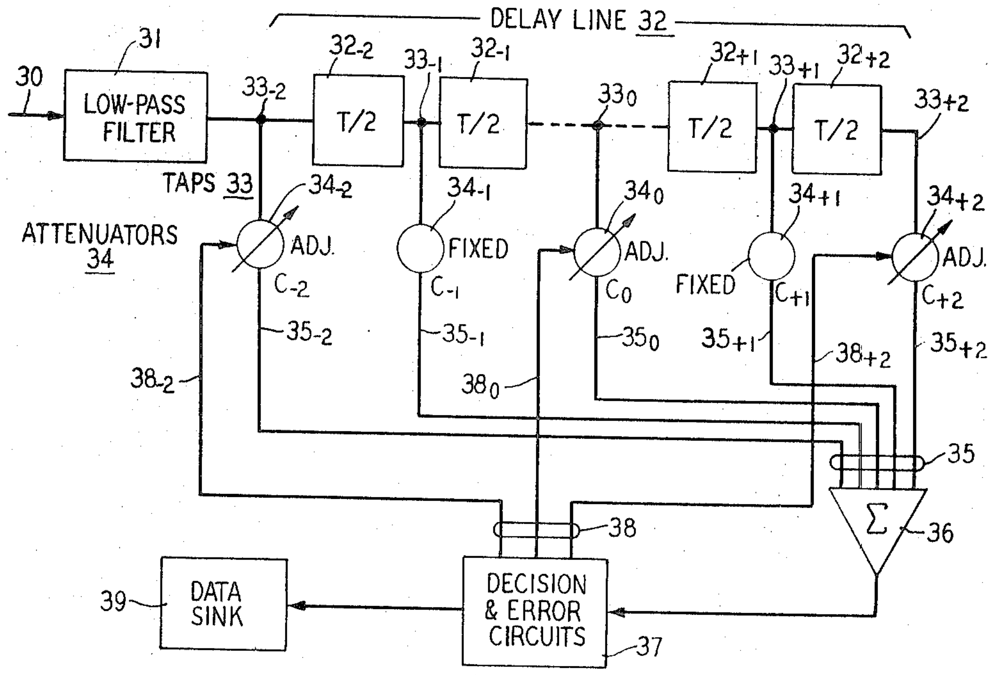
FIG. 3 is a block schematic diagram of an illustrative embodiment of a transversal equalizer adapted to perform the dual functions of impulse-response equalization and signal shaping according to this invention.

FIG. 3 is a block schematic diagram of a digital data receiver including a transversal equalizer of the type shown in FIG. 1 but modified in accordance with this invention to have a unit delay between taps of T/2-second, where T is the data symbol interval. Designators used in FIG. 3 are keyed to FIG. 1 insofar as possible with a tens' digit of 3 rather than 1.

In FIG. 3 input baseband (post demodulation) signals on lead 30 are optionally low-pass filtered in conventional filter 31 (in substitution for the more complex band-pass receiving filter 11 in FIG. 1) for out-of-band noise suppression only and then applied to delay units 32, shown here as four tandem discrete units $32_{12}$, $32_{11}$, $32_{+1}$, and $32_{+2}$. The dashed line between units $32_{11}$ and $32_{+1}$ suggests that additional delay units of the same type may be included to increase the precision of control. Each unit has the previously specified delay of T/2-second. These delay units separate tapping points 33, of which there are typically an odd number, including a center or reference tap $33_0$. Symmetrically located with respect to the center tap $33_0$ are odd-ordered taps $33_{11}$ and $33_{+1}$ as well as even-ordered taps $33_{12}$ and $33_{+2}$. To each tap is connected an attenuator 34 for tap gain control. Attenuator $34_0$ is shown at the center tap $33_0$ and this attenuator is assumed to be regulated for a normalized peak amplitude of unity. The remaining tap attenuators are controlled as explained below. The attenuator outputs of all the taps are combined in linear adder or summation circuit 36. Decision and error circuit 37 operates on the summed signal output of adder 36 and supplies attenuator control signals over leads 38 to those attenuators requiring adjustment and also output data to data sink 39.

It could readily be arranged that all tap attenuators 34 be adjusted to alleviate intersymbol interference in the manner of my adaptive attenuators adjustable incrementally over a range of plus and minus values.

As another alternative a root-mean-square error or criterion might be employed. In this event proportional attenuator adjustments, as distinguished from incremental adjustments, would be made by means of field effect control transistors or motor-controlled attenuators, as are known in the art.

One of the most important applications of the automatic transversal equalizer is to the field of digital data transmission over the common carrier telephone network. In this network the signal-to-noise ratio is relatively high and therefore the control of intersymbol interference is of more crucial importance than the control of the frequency spectrum. Consequently, in the embodiment of FIG. 3 the even-ordered tap attenuators are shown adjustable and the odd-ordered tap attenuators are shown fixed. Initially, the odd-ordered taps are set once and for all on a compromise basis by calculation or otherwise to give good average performance with an advantageous spectral shaping. The fixed attenuators may advantageously be discrete, printed, or thin-film components. They are entirely passive. Any required signal inversion may be accommodated in adder 36, if an operational amplifier with inverting and noninverting inputs is assumed. The even-ordered taps continue to be adaptively adjusted to compensate for intersymbol interference. The even-ordered attenuators require a range of adjustment over plus and minus values and also are preferably suited to incremental adjustment. Therefore, the adjustable attenuators are of the same type required in my cited patent. The outputs of fixed and adjustable attenuators are combined in adder 36 and are operated on together to obtain incrementation directions for the adjustable attenuators.

Figure 4:
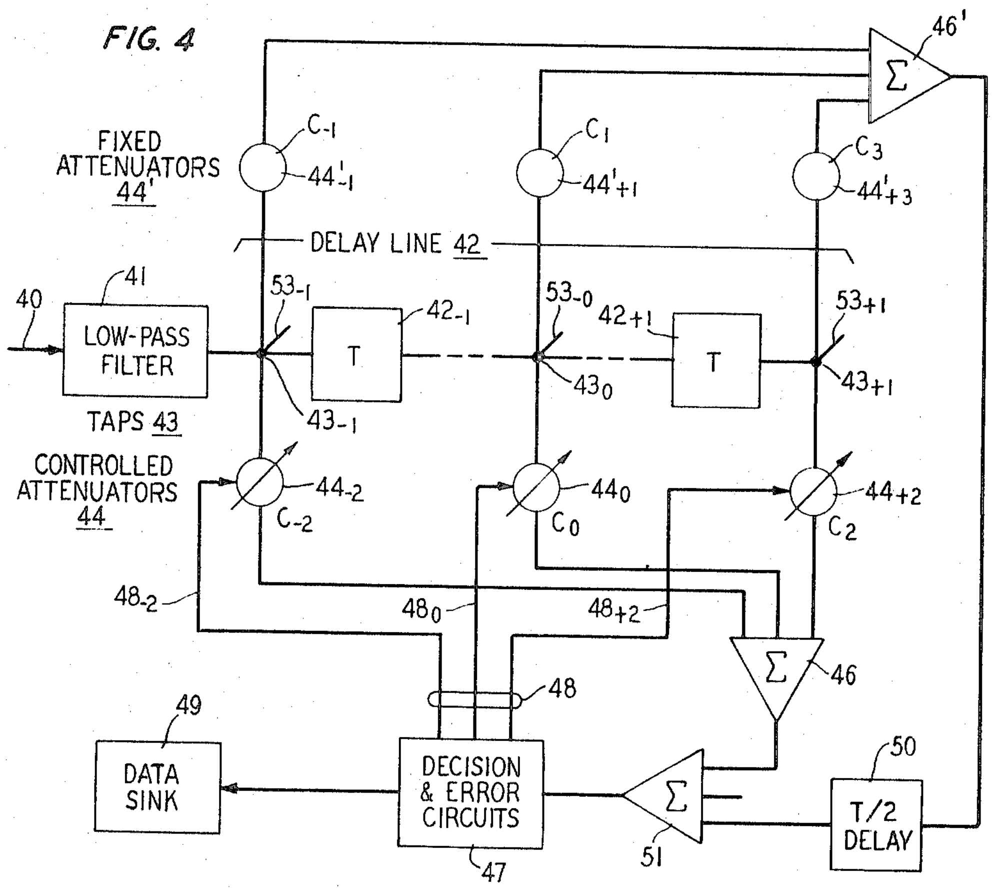
FIG. 4 is a block schematic diagram of an illustrative embodiment of a transversal equalizer modified to perform a signal shaping function according to this invention.

FIG. 4 is a block schematic diagram of a digital data receiver including a transversal equalizer with the same tap spacing as that shown in FIG. 1, but modified externally to perform the dual functions of intersymbol interference reduction and spectral shaping. All designators in FIG. 4 correspond as closely as possible, except for the most significant digit 4, to those in FIGS. 1 and 3.

The data receiver of FIG. 4 comprises an input 40, an optional low-pass filter 41; a delay line 42 with delay units such as $42_{11}$ and $42_{+1}$, each having a delay of T second separating tapping points $43_{11}$, $43_0$ and $43_{+1}$; a linear adder 46 for the outputs of controlled attenuators 44; decision and error circuit 47 and data sink 49. A data receiver with the elements just enumerated operates exactly as does that shown in FIG. 1. The receiver of FIG. 4 can be made to operate in the manner of, and to be completely equivalent in function to, the receiver of FIG. 3 by providing fixed attenuators 44′, including attenuators $44'_{11}$, $44'_{+1}$ and $44'_{+3}$, connected to respective tapping points $43_{11}$, $43_0$ and $43_{+1}$ on delay line 42, linear adder 46′ and delay unit 50 having a delay of T/2 second. Fixed attenuators 44′ are set initially to establish the desired spectral shaping in the combination output of adder 46′. The output of adder 46′ is delayed by half the delay unit interval T of delay line 42. The delayed spectral shaping output of delay unit 50 is combined further in additional adder 51 with the normal equalized output of adder 46 to drive decision and error circuits 47.

It is apparent that the separate functions of adders 46, 46′ and 51 can be combined in a single operational amplifier.

The arrangement of FIG. 4 has the same intersymbol interference control capabilities as that of FIG. 1, but now has in addition the power to do much of the spectral control generally associated with conventional lumped-constant receiver filters.

The arrangement of FIG. 4 may be conceived also as a parallel combination of an ideal frequency domain filter, including fixed attenuators 44′, adder 46′ and delay unit 50, and a time-domain transversal equalizer with the T second tap spacing shown in FIG. 1, including controlled attenuators 44 and adder 46. The tap gains established by the controlled attenuators 44 minimize intersymbol interference adaptively. When the transmission channel is perfect the variable tap gains are zero and the arrangement operates as though only the fixed-gain attenuators 44′ were present in the circuit.

The principle of operation of the arrangement of FIG. 4 is not restricted to controlling the spectral response to a transmission bandwidth normalized at $2\pi/T$ radians per second, i.e., twice the Nyquist bandwidth. For example, by taking two resistive branches from each tap 43 on delay line 42 (as indicated by stub leads $53_{11}$, $53_0$ and $53_{+1}$ in FIG. 4), passing one set of branches through a T/3 delay (in place of T/2 delay 50) and the other through a 2T/3 delay (not shown), a bandwidth of $3\pi/T$ can be controlled. The stub lead at the input of adder 51 accommodates the summation of additional outputs, if provided, delayed by 2T/3, for this example. Still wider bandwidths can be controlled by adding more branches and delays in an obvious manner. The basic circuit of FIG. 4 with only one set of fixed attenuator branches appears at present to meet the requirements for normal data system applications.

What is claimed is:

1. In combination with a transversal equalizer for compensating the baseband response of a distorting transmission channel connected thereto, a first plurality of attenuators connected at multiples of a synchronous signaling interval along said equalizer adaptively adjustable to control the impulse response of said channel, a second plurality of attenuators also connected at multiples of a synchronous signaling interval along said equalizer and independently set to impart a desired frequency response to said channel and equalizer, and means for combining into a substantially interference-free output signal the impulse-response corrected totality of signals from said first plurality of attenuators with the frequency response corrected totality of signals from said second plurality of attenuators, said respective totalities being relatively displaced in time with respect to each other by a fraction of a signaling interval.

2. The combination set forth in claim 1 in which attenuators from said first and second pluralities alternate with each other along said equalizer at half-signaling intervals.

3. The combination set forth in claim 1 in which attenuators from said first and second pluralities connect with each other in pairs along said equalizer at full signaling intervals and the totality of signals from said first plurality of attenuators is displaced in time from the totality of signals from said second plurality of attenuators by a half-signaling interval.

4. In combination with a transversal equalizer in which impulse-response components of received synchronous digital signals differentially delayed with respect to each other by multiples of the synchronous signaling interval are adaptively multiplied by factors which minimize intersymbol interference resulting from passing through a distorting transmission medium, means for selectively attenuating components of said received signals differentially delayed with respect to each other by multiples of the synchronous signaling interval in accordance with a desired frequency response within the bandwidth of said transmission medium, means for delaying signals from said attenuating means by a predetermined fraction of the synchronous signaling interval relative to corrected impulse-response components from said equalizer, and means for combining corrected impulse-response components with delayed frequency response components to form optimized substantially interference free received signals.

5. The combination set forth in claim 4 in which said equalizer includes a plurality of tapping points at intervals which are multiples of half-signaling intervals, said multipliers for impulse-response correction are connected at a reference tapping point and at even-ordered tapping points relative to the reference point, and said attenuating means for frequency response control are connected at odd-ordered tapping points relative to the reference point.

6. The combination set forth in claim 5 in which said equalizer includes a plurality of tapping points at intervals which are multiples of full signaling intervals, and said multipliers for impulse-response correction and said attenuating means for frequency response control are connected in pairs to each of said tapping points.

* * * * *